G. W. PRYOR.
DEVICE FOR SCREENING SEED.
APPLICATION FILED JULY 18, 1911.
1,045,435.
Patented Nov. 26, 1912.
2 SHEETS—SHEET 1.
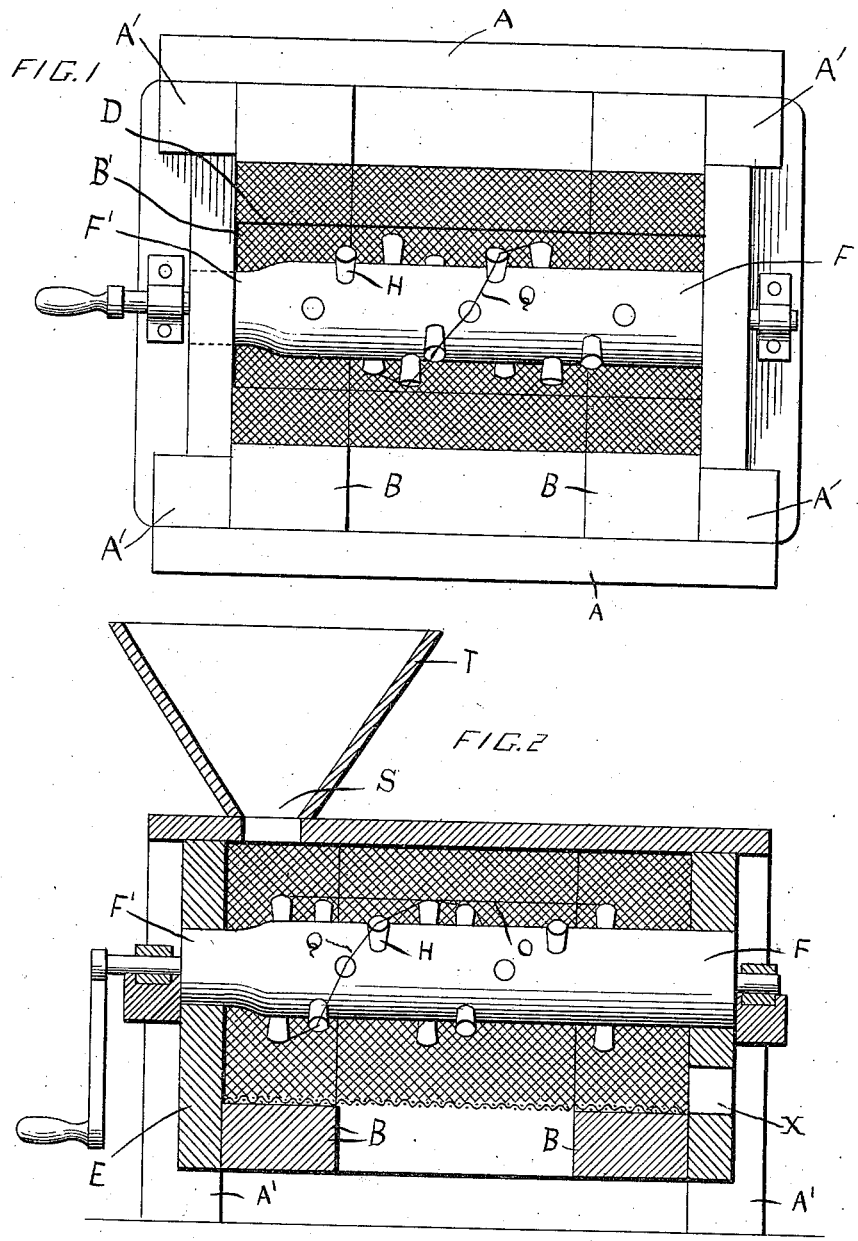

G. W. PRYOR.
DEVICE FOR SCREENING SEED.
APPLICATION FILED JULY 18, 1911.

1,045,435.

Patented Nov. 26, 1912.
2 SHEETS—SHEET 2.

WITNESSES

INVENTOR
Geo. W. Pryor,
BY
Franklin N. Hough
Attorney

UNITED STATES PATENT OFFICE.

GEORGE W. PRYOR, OF GREENVILLE, GEORGIA.

DEVICE FOR SCREENING SEED.

1,045,435.  Specification of Letters Patent.  Patented Nov. 26, 1912.

Application filed July 18, 1911. Serial No. 639,188.

*To all whom it may concern:*

Be it known that I, GEORGE W. PRYOR, a citizen of the United States, residing at Greenville, in the county of Meriwether and State of Georgia, have invented certain new and useful Improvements in Devices for Screening Seed; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in apparatus for separating good from bad seed and comprises a simple and efficient apparatus of this nature having various details of construction and combinations and arrangements of parts which will be hereinafter fully described and then specifically defined in the appended claim.

I illustrate my invention in the accompanying drawings, in which:—

Figure 3:
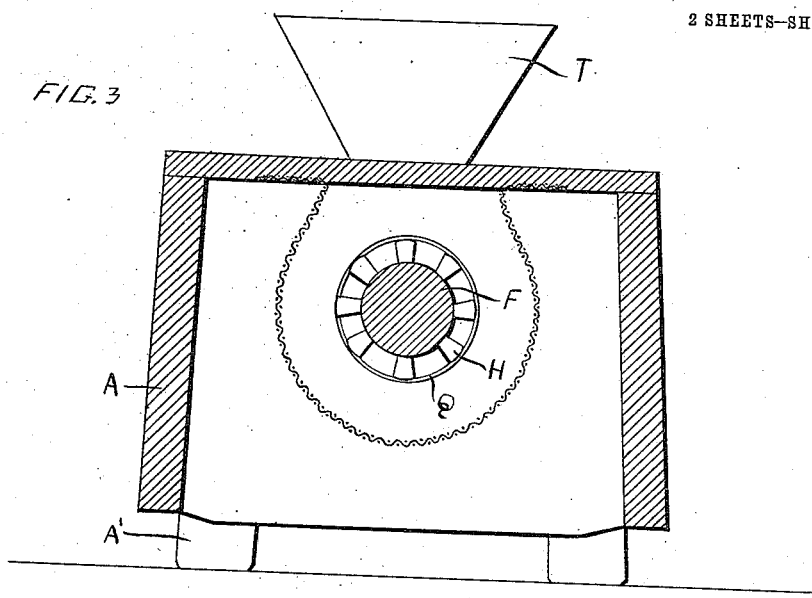
Figure 4:
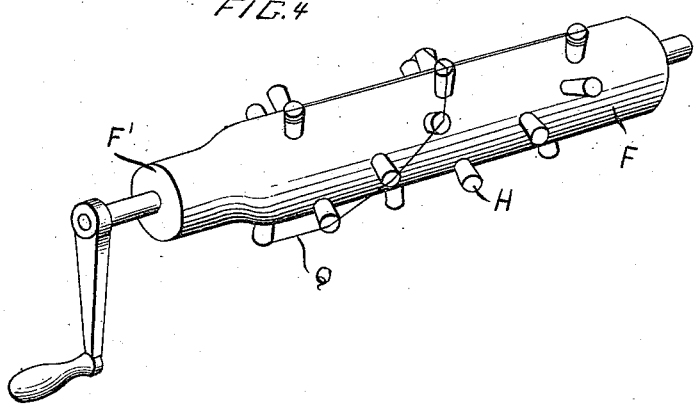

Figure 1 is a top plan view of my improved apparatus for separating seed. Fig. 2 is a longitudinal sectional view. Fig. 3 is a central cross sectional view, and Fig. 4 is a detail perspective of the stirrer shaft.

Reference now being had to the details of the drawings by letter, A designates a casing of the apparatus supported upon legs A' and B designates cross-pieces which are concaved as at B' upon their upper edges for the reception of the screening D, which is of any suitable mesh, and one end of the screening is closed by the end E while the other end is open, forming an exit X through which the good seed is allowed to fall. A rotatable shaft F having spindle ends F' is journaled in suitable bearings in the frame of the apparatus and projecting from said shaft is a spiral series of fingers H. A crank handle is fastened to one end of the shaft and forming means whereby the same may be rotated.

A wire, designated by letter Q, is fastened to the ends of one of the spiral series of fingers as shown and is adapted to move the seed against the screen for the purpose of allowing the poorer seed or foreign matter to fall through the mesh of the screen and advance the good seed toward the exit end of the screen where it is allowed to fall through the open end. A second wire Q is fastened to certain of the fingers, as shown clearly in Fig. 4 of the drawings, and runs longitudinally of the shaft and also serves the same purpose as does the wire above referred to. The casing has a suitable hopper T with a slot S therein, into which the seed is dropped.

In operation, the seed is poured through the slot upon the shaft and allowed to fall upon the screen below. As the shaft is rotated, the wire and the fingers will cause the seed to be agitated and fed forward, allowing foreign matter or poor seed to fall through the mesh work while the good seed is advanced and deposited at the open end of the screen.

What I claim to be new is:—

An apparatus for separating seed comprising a receptacle having a screen therein, a rotatable shaft journaled within the casing and having spirally arranged stirrer fingers projecting from said shaft, a horizontally disposed wire connecting the end fingers of the series, and a second wire running spirally about the shaft and fastened to the spirally arranged fingers thereon, as shown and described.

In testimony whereof I hereunto affix my signature in the presence of two witnesses.

GEORGE W. PRYOR.

Witnesses:
W. P. HILL,
E. D. SMITH.

Copies of this patent may be obtained for five cents each, by addressing the "Commissioner of Patents, Washington, D. C."